US012784354B1

(12) United States Patent
Scholz et al.

(10) Patent No.: US 12,784,354 B1
(45) Date of Patent: Nov. 3, 2026

(54) NON-ITERATIVE OCTREE-BASED SITE DISTRIBUTION FOR CLIPPED VORONOI PARTITIONS

(71) Applicant: Synopsys, Inc., Sunnyvale, CA (US)

(72) Inventors: Dominik Scholz, Canonsburg, PA (US); Vaibhav Kurade, Canonsburg, PA (US)

(73) Assignee: Synopsys, Inc., Sunnyvale, CA (US)

( * ) Notice: Subject to any disclaimer, the term of this patent is extended or adjusted under 35 U.S.C. 154(b) by 58 days.

(21) Appl. No.: 18/929,940

(22) Filed: Oct. 29, 2024

(51) Int. Cl.
*G06T 17/00* (2006.01)
*G06T 15/30* (2011.01)
*G06T 19/20* (2011.01)

(52) U.S. Cl.
CPC ............ *G06T 17/005* (2013.01); *G06T 15/30* (2013.01); *G06T 19/20* (2013.01); *G06T 2210/21* (2013.01); *G06T 2219/2021* (2013.01)

(58) Field of Classification Search
CPC ....... G06T 17/005; G06T 15/30; G06T 19/02; G06T 2210/21; G06T 2219/2021
See application file for complete search history.

(56) References Cited

U.S. PATENT DOCUMENTS 10,776,537 B1 * 9/2020 Ebeida .................... G06F 30/20
10,867,442 B1 * 12/2020 Lee ........................ G06T 17/205

OTHER PUBLICATIONS

"Accelerate Engineering Innovation with Fidelity CFD Software" Fidelity CFD Platform. 10 pages.
Bres et al. "Large-eddy simulations of co-annular turbulent jet using a Voronoi-based mesh generation framework." 13 pages.
Gan et al. "Automatic and efficient hybrid viscous mesh generation based on clipped Voronoi diagrams." 19 pages.
Sozer at el. "Evaluation of Voronoi Meshes for Large Eddy Simulations of High Lift Aerodynamics." 24 pages.
Abdelkader et al. "VoroCrust: Voronoi Meshing Without Clipping." 16 pages.

* cited by examiner

*Primary Examiner* — Kee M Tung
*Assistant Examiner* — Thang Gia Huynh
(74) *Attorney, Agent, or Firm* — FBT Gibbons LLP

(57) ABSTRACT

According to one embodiment, a method, computer system, and computer program product for mapping a space with a Voronoi partition. The embodiment may include creating a spatial subdivision tree comprising a plurality of cells. The embodiment may also include identifying one or more dual edges, where each dual edge connects centroids of two adjacent cells. The embodiment may further include identifying a set of intersections of dual edges with a boundary. The embodiment may also include identifying a set of snapped points. The embodiment may further include removing a plurality of exterior points, as well as centroids that neighbor snapped points. The embodiment may also include identifying a Voronoi partition from a set of remaining centroids and snapped points, clipping the Voronoi partition, and creating boundary patches for the Voronoi partition.

20 Claims, 10 Drawing Sheets

NON-ITERATIVE OCTREE-BASED SITE DISTRIBUTION FOR CLIPPED VORONOI PARTITIONS

BACKGROUND

The present invention relates generally to the field of computing, and more particularly to simulation and modeling.

Classic physics commonly simplifies many qualities of truly complex systems; objects often become spherical, or even point masses; air pressure is assumed to be constant and uniform, or a system is assumed to be a vacuum; various aspects of systems are simplified to make problems solvable. However, computers allow for much more complex analyses of these systems, complete with features such as complex mappings of a space and dynamic updating of said features. This allows for accurate, advanced modeling of not only stable systems, but dynamic ones as well.

Mesh generation in computer simulation refers to the process of creating a mesh, which is a discrete representation of a continuous geometric space. Such a mesh is used to solve physical problems numerically, especially in computational fields like finite element analysis (FEA), computational fluid dynamics (CFD), and computer graphics. A mesh divides a complex shape or domain into smaller, simpler elements such as triangles, quadrilaterals, general polygons, or tetrahedra, hexahedra, or general polyhedra, in the cases of a two dimensional (2D) or three dimensional (3D) domain.

In many applications such as interactive simulations, shape optimization, topology optimization, etc., fast and fully automated mesh generation is required. Cartesian cut cell methods are a common choice for fast and fully automated mesh generation. According to Cartesian cut cell methods, cells of a regular Cartesian grid (e.g. a grid aligned with the x, y, z axes) are split by the boundary of the simulation domain into sub-cells. This method allows the use of a structured, grid-based mesh while adapting it to irregular or complex boundaries (such as curved or sloped surfaces). Cartesian cut cell methods, however, suffer from mesh quality issues such as sliver cells and sliver boundary faces and have no control on mesh quality.

As an alternative, clipped Voronoi diagrams can be used for mesh generation. A clipped Voronoi diagram is a variant of a standard Voronoi diagram where the diagram is restricted or "clipped" to a specific region or boundary. Voronoi diagrams divide a space into regions based on proximity to a set of points (called sites), but in a clipped Voronoi diagram, the boundaries of these regions are limited by an external shape or domain, like a polygon, rectangle, or circle in 2D, or polyhedron, box, or sphere in 3D. While clipped Voronoi diagrams are usually slower to create than Cartesian methods, clipped Voronoi diagrams provide a flexible mesh generation framework. A problem to solve regarding clipped Voronoi is to find an appropriate Voronoi site distribution which results in good quality meshes (e.g., avoiding above mentioned sliver cells and sliver boundary faces), and the process of finding such a site distribution must be fast for above mentioned applications.

Thus, there is a need in the art to create an appropriate Voronoi site distribution representing the desired mesh resolution, where the site distribution should be computed explicitly without the need of expensive iterations for optimization, smoothing, etc. Additionally, it is desirable for the resulting mesh to have conformal interfaces in case of multiple volume zones.

SUMMARY

According to one embodiment, a method, computer system, and computer program product for mapping a space with a Voronoi partition. The embodiment may include creating a spatial subdivision tree comprising a plurality of cells. The embodiment may also include identifying one or more dual edges, where each dual edge connects centroids of two adjacent cells. The embodiment may further include identifying a set of intersections of dual edges with a boundary. The embodiment may also include identifying a set of snapped points. The embodiment may further include removing a plurality of exterior points, as well as centroids that neighbor snapped points. The embodiment may also include identifying a Voronoi partition from a set of remaining centroids and snapped points, clipping the Voronoi partition, and creating boundary patches for the Voronoi partition.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
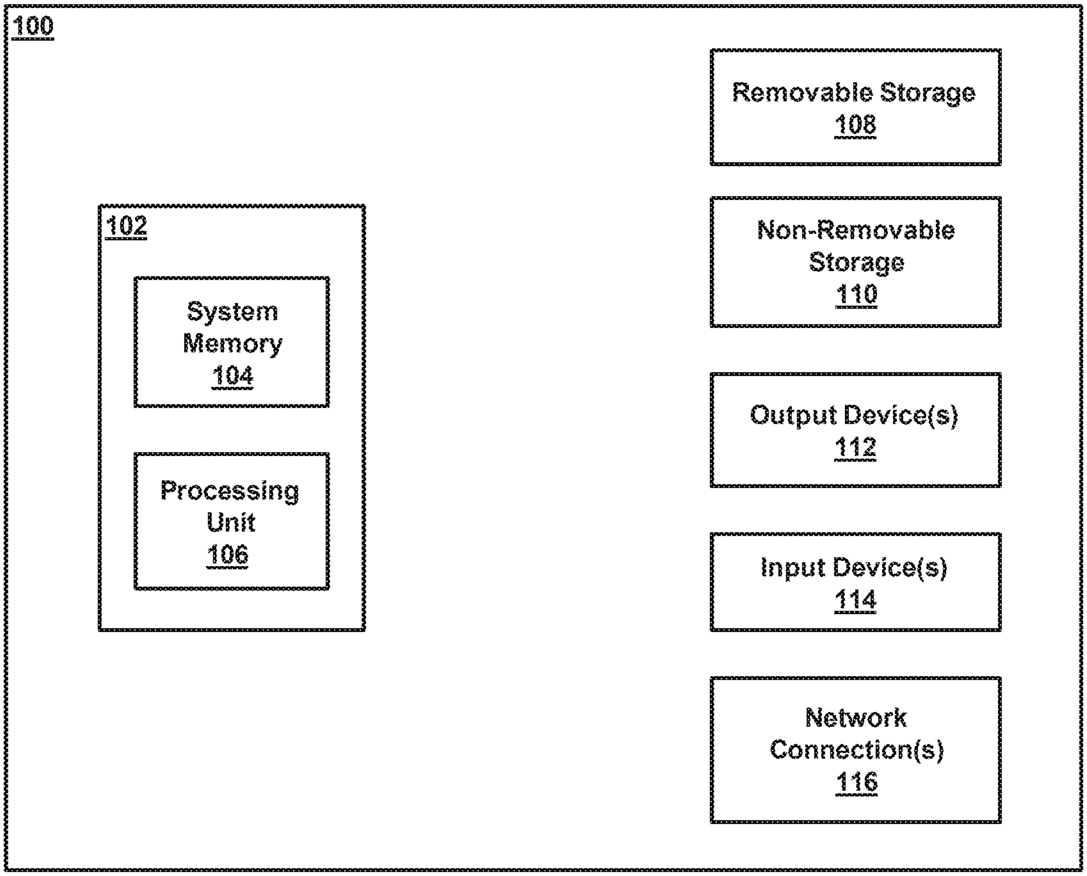
FIG. 1 depicts an exemplary computing device or computer system with several components.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for partitioning a space generally, it will become evident to those skilled in the art that the implementations are not limited thereto, and are especially applicable for simulating structural systems, thermal systems, fluid dynamic systems, electromagnetic systems, and Multiphysics systems, and a wide variety of other systems and scenarios, particularly with non-iteratively generated Voronoi diagrams that avoid sliver cells and similar issues.

As used herein, the terms "about" or "approximately" when referring to a measurable value such as an amount, a percentage, and the like, is meant to encompass variations of ±20%, ±10%, ±5%, or ±1% from the measurable value.

It should be appreciated that the logical operations described herein with respect to the various figures may be implemented (1) as a sequence of computer implemented acts or program modules (i.e., software) running on a computing device (e.g., the computing device described in FIG. 1), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Referring to FIG. 1, an example computing device 100 upon which the methods described herein may be implemented is illustrated. It should be understood that the example computing device 100 is only one example of a suitable computing environment upon which the methods described herein may be implemented. Optionally, the computing device 100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 100 typically includes at least one processing unit 106 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 1 by box 102. The processing unit 106 may be a standard programmable processor that performs arithmetic and logic operations necessary for operation of the computing device 100. The computing device 100 may also include a bus or other communication mechanism for communicating information among various components of the computing device 100.

Computing device 100 may have additional features/functionality. For example, computing device 100 may include additional storage such as removable storage 108 and non-removable storage 110 including, but not limited to, magnetic or optical disks or tapes. Computing device 100 may also contain network connection(s) 116 that allow the device to communicate with other devices. Computing device 100 may also have input device(s) 114 such as a keyboard, mouse, touch screen, etc. Output device(s) 112 such as a display, speakers, printer, etc. may also be included. The additional devices may be connected to the bus in order to facilitate communication of data among the components of the computing device 100. All these devices are well known in the art and need not be discussed at length here.

The processing unit 106 may be configured to execute program code encoded in tangible, computer-readable media. Tangible, computer-readable media refers to any media that is capable of providing data that causes the computing device 100 (i.e., a machine) to operate in a particular fashion. Various computer-readable media may be utilized to provide instructions to the processing unit 106 for execution. Example tangible, computer-readable media may include, but is not limited to, volatile media, non-volatile media, removable media and non-removable media implemented in any method or technology for storage of information such as computer readable instructions, data structures, program modules or other data. System memory 104, removable storage 108, and non-removable storage 110 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 106 may execute program code stored in the system memory 104. For example, the bus may carry data to the system memory 104, from which the processing unit 106 receives and executes instructions. The data received by the system memory 104 may optionally be stored on the removable storage 108 or the non-removable storage 110 before or after execution by the processing unit 106.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 2:
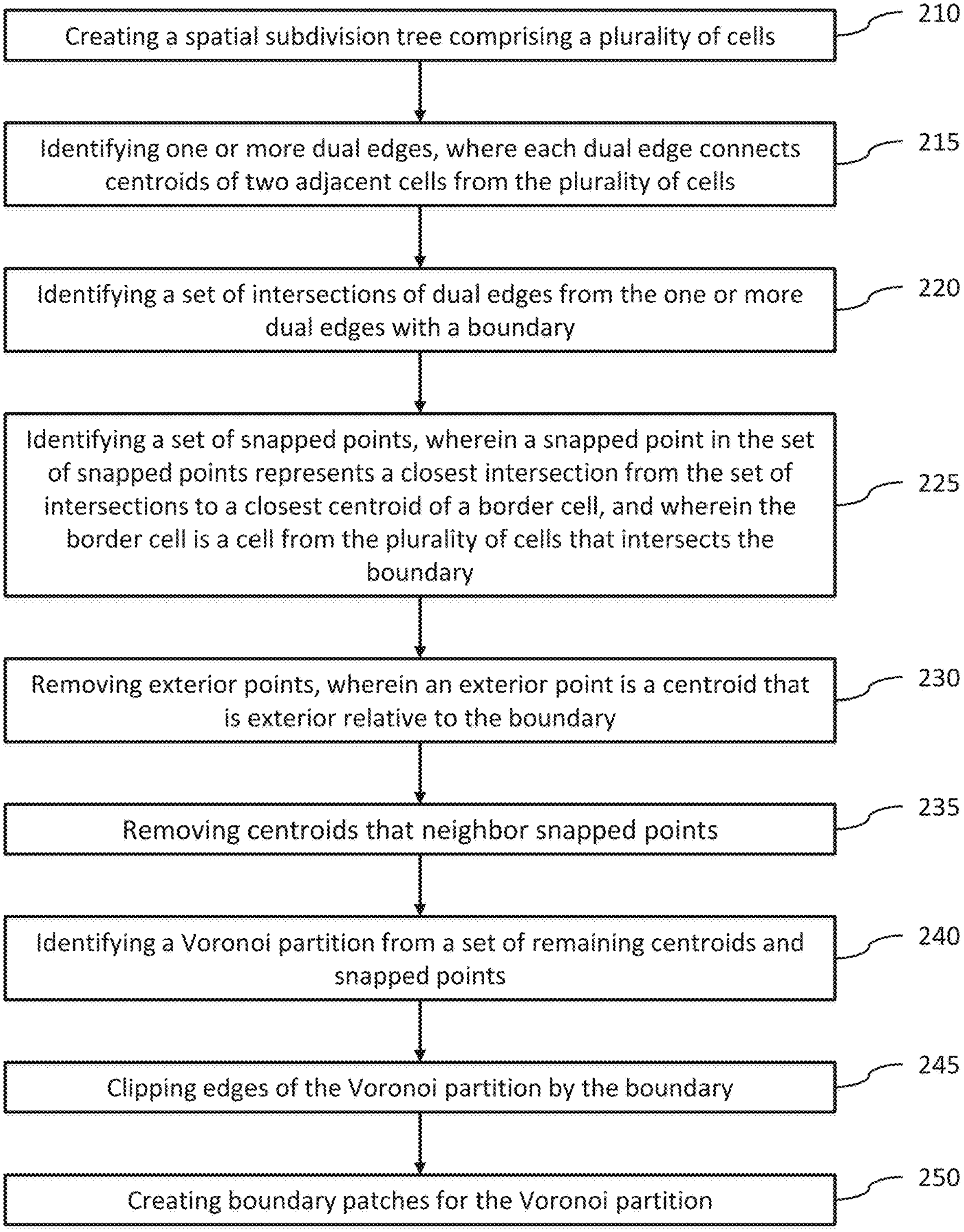
FIG. 2 is an exemplary flowchart of an example method for preparing a Voronoi partition of a space or system.

FIG. 2 is an exemplary flowchart of an example method for preparing a Voronoi partition of a space including a physical object or system. Method steps may be performed by or on computing device 100, communicatively coupled devices including peripheral devices and devices connected by a network connection, or by a software program running on one or more computing devices, alone or in combination.

The method of FIG. 2 can be performed using various methods, including the Finite Volume Method (FVM) or Finite Element Analysis (FEA). The method may optionally be applied during discretization of models of physical objects or systems for FEA. FEA is a mathematical tool for solving boundary value problems (BVP). A BVP is a system of differential equations with solution and derivative values specified at more than one point, for example, at the boundary of a model. According to FEA, a model (e.g., a 2D or 3D model) is broken into a finite number of small pieces (e.g., elements). This is sometimes referred to as "discretization" or "meshing." Each individual element is represented by a set of element equations, where a set is one or more equations. The set of element equations for each individual element locally approximates the partial differential equations being analyzed. The respective sets of element equations for the individual elements are linked using compatibility or continuity equations to create a matrix. Boundary conditions are then applied, and the matrix is solved. It should be understood that FEA is used to solve BVPs in applications including, but not limited to, mechanical (e.g., stress), thermal (e.g., heat transfer), fluid flow, and electromagnetic. Although FEA applications are provided as an example, it should be understood that the method of FIG. 2 is applicable to other types of simulation models including, but not limited to, electromechanical, electromagnetic, thermal, and computational fluid dynamic (CFD), as well as other numerical techniques, such as the virtual element method.

Figure 3A:
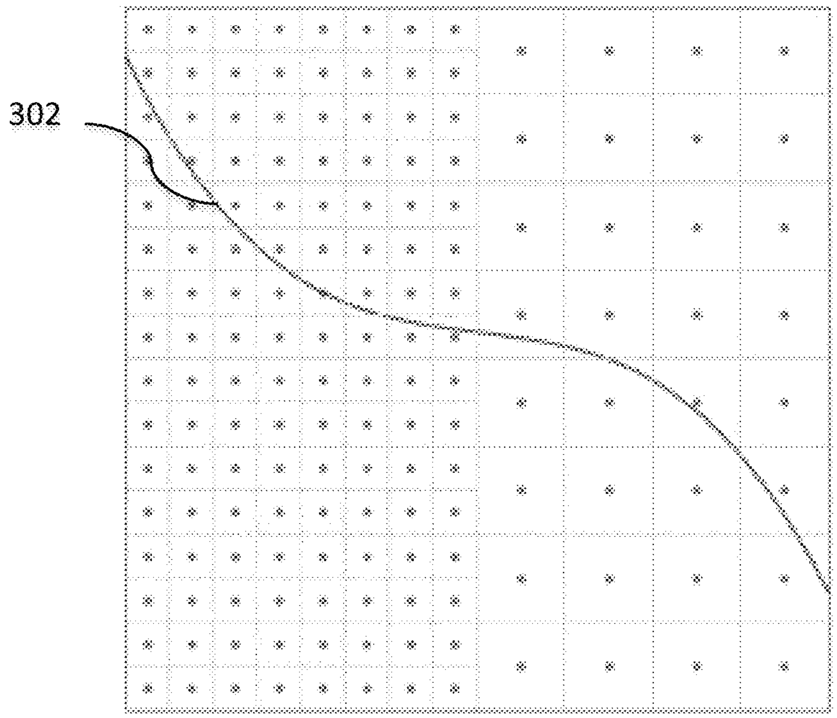
FIGS. 3A-G are exemplary states of spatial distribution in the process preparing a Voronoi partition of a space or system according to the method of FIG. 2.

At step 210, the method includes creating a spatial subdivision tree comprising a plurality of cells. An example spatial subdivision tree is shown in FIG. 3A. A spatial subdivision tree may be any tree that subdivides a space, and may represent the space it subdivides. A space may include any objects, activities, or systems to be modeled, simulated, or otherwise understood.

A spatial subdivision tree may be any tree that subdivides a space, including, for example, an octree that subdivides a three-dimensional space into eight nodes branching from each node above it, or into eight cells, each subdivided into eight more cells until a desired resolution or depth is reached. An N-dimensional space may be subdivided by a tree of order 2N. An octree may subdivide a space by eight into cubic cells; a two-dimensional space may be subdivided by fours into square cells. The subdivision may be referred to as a tessellation or tiling of the space.

A depth of a tree may include the number of levels of the tree; a resolution of subdivisions may include a general resolution of an entire tree, which may match the depth. Alternatively, depth or resolution may be considered at a local scale; some branches may go further down than others, and, similarly, some areas within the space may be subdivided at a greater resolution than others. For example, if a two-dimensional tree is subdivided into four cells, the two cells on the right half of the tree may further be subdivided twice into eight and 32 cells, and the eight topmost cells of those 32 cells may further be subdivided three times into 128 cells, leading to a maximum tree depth of 6 and a maximum resolution of 6 in the top quarter of the right half of the space.

A space may include any objects, activities, or systems to be modeled, simulated, or otherwise understood, including physical objects and systems and hypothetical objects and systems. Such objects and systems can include those subject to engineering and physics simulations including, but not limited to, structural, thermal, fluid dynamic, electromagnetic objects and/or systems. Specific examples of systems contained in a space may include a series of interconnected pipes for fluids to travel through; a vehicle's interior and parts therein for heating, cooling, and ventilation of the interior; or a person operating a bicycle. It should be understood that these are provided only as examples. More generally, systems may include structural systems, thermal systems, fluid dynamic systems, electromagnetic systems. These and any other system may be included in a space in whole or in part, or in combination with any other system.

The subdivision may be tailored to the system; for example, the subdivisions may be performed with greater resolution with areas of interest, such as the inside of a pipe or areas of a pipe that leak fluid, and lower resolution around areas of the system of lower interest, such as areas external to the pipe, areas far from the pipe, or areas that are unlikely to interact with any fluid.

Figure 3B:
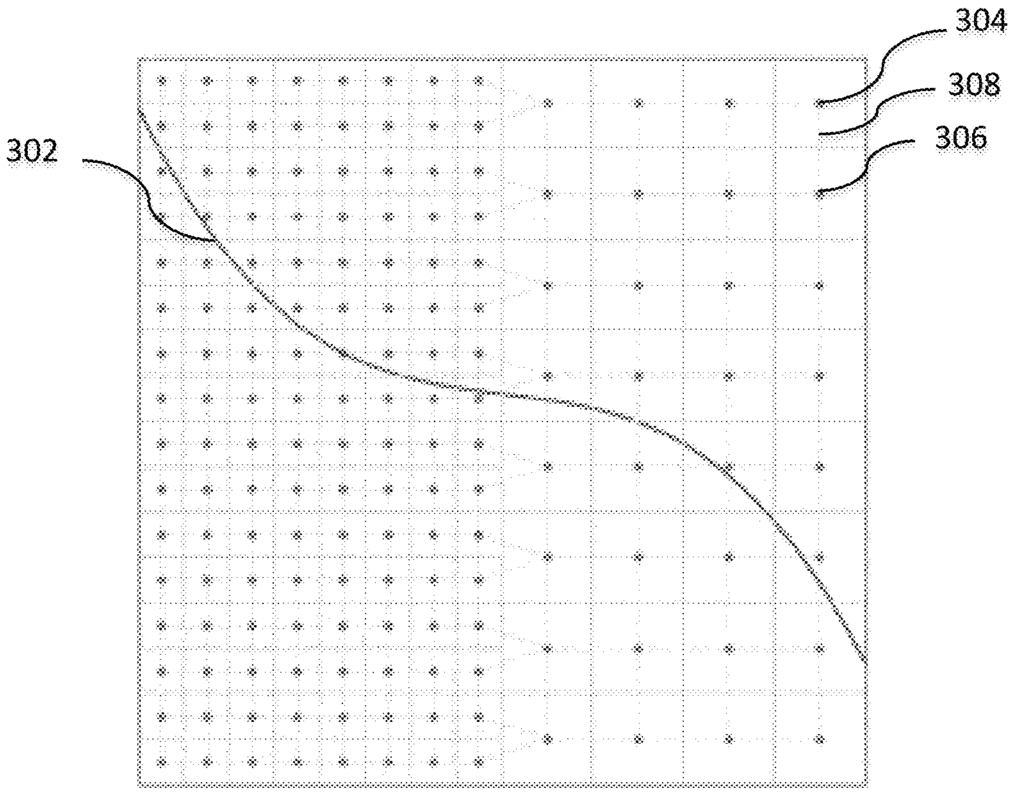

At step 215, the method includes identifying one or more dual edges. An example identification of dual edges is shown in FIG. 3B. Each dual edge may connect centroids of two adjacent cells from the plurality of cells. A dual edge may connect centroids by a straight line segment, which may be the shortest line segment between the two centroids. The line segment may cross a side or edge between two dimensional cells or a face or side of three dimensional cells. For example, centroid 304 and centroid 306 at FIG. 3B may be connected by the straight line segment between them, dual edge 308.

Figure 3C:
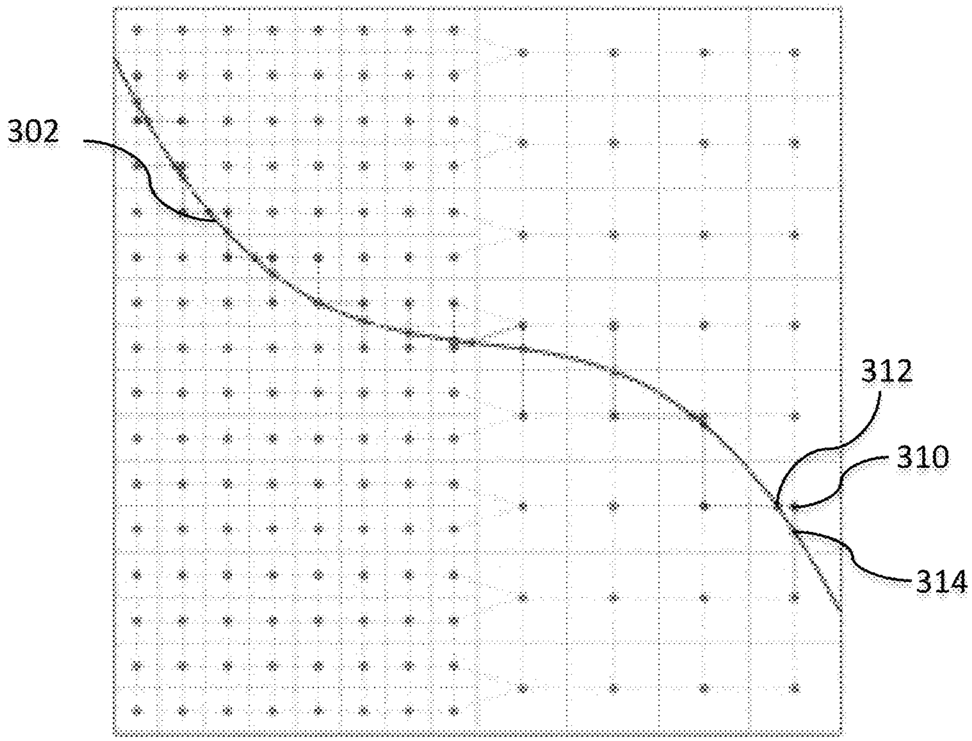

At step 220, the method includes identifying a set of intersections of dual edges from the one or more dual edges with a boundary. FIGS. 3A-3H contain, for example, boundary 302. FIG. 3C shows an example of intersections of dual edges from the one or more dual edges with boundary 302. A boundary may be any portion of the space, including a line, plane, or hyperplane in the space, a curve, or a more complex shape. A boundary may be identified by a human user, or by a computational process, including an algorithm or a trained machine learning model. The method may identify any number of boundaries.

A human or computational process may select a boundary relating to a point of interest or meaningful boundary in a system. For example, if a system pertains to a vehicle interior, the boundary may be the interior boundary of the vehicle—the doors, windows, windshields, roof, floor, and associated paneling- or a portion thereof. Alternatively, if a system models a pipe and the space around it, but is particularly interested in the pipe itself, the boundary may be the inner or outer edge of the pipe. In a two-dimensional space representing the pipe, there may be one boundary on one side of the pipe and another boundary on the other side of the pipe. Boundaries may be any shape in any number of dimensions compatible with the space.

Computational processes for determining a boundary may include, for example: an imperative program suited to a particular type of system; an image recognition algorithm or similar used to identify points of interest in a visual representation of the space; or a machine learning model such as a neural network trained to recognize useful boundaries.

Figure 3D:
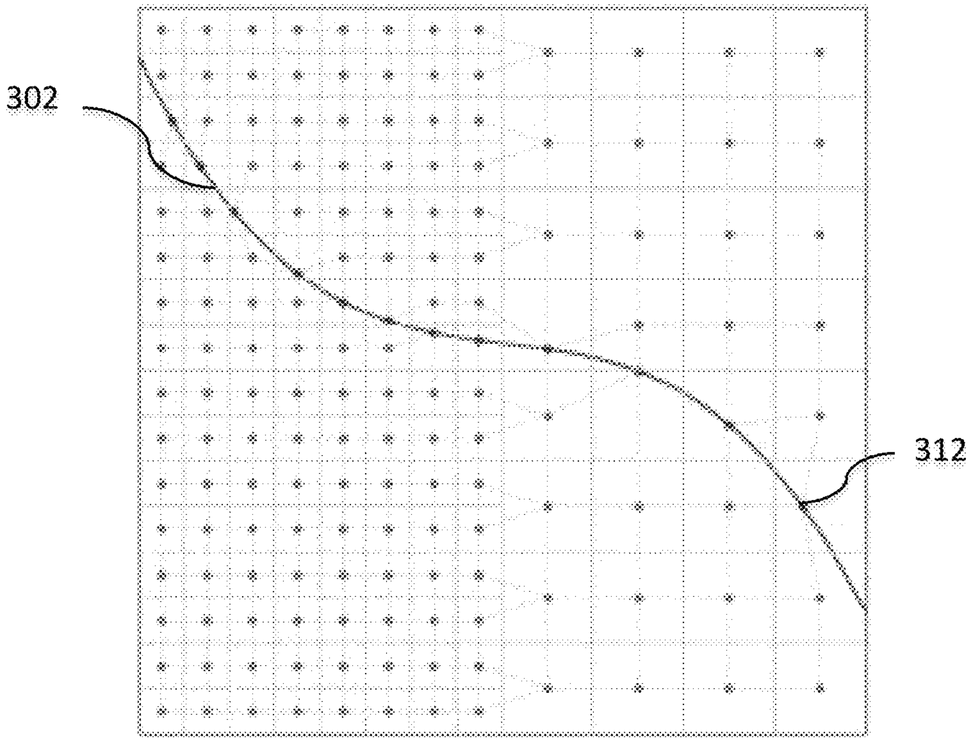

At step 225, the method includes identifying a set of snapped points. An example identification of a set of snapped points is shown in FIG. 3D. A snapped point may represent a closest intersection from the set of intersections to a closest centroid of a border cell. For example, centroid 310 may be nearby intersection points 312 and 314 (as portrayed in FIG. 3C), and may be snapped to point 312 (as portrayed in FIG. 3D). A border cell may be a cell that intersects the boundary 302, or has an edge that intersects, overlaps with, or is tangential to the boundary. For example, cell 316 may be a boundary cell. As another example, the cell surrounding centroid 310 or snapped point 312 may be a border cell, whereas the cells surrounding centroid 304 and centroid 306 may be non-border cells.

A centroid may be snapped to a snapped point at a nearest intersection by any procedure, including an ordered approach such as a right-to-left, top-to-bottom, or arbitrarily or randomly selected order, where snapped points may overlap with one another or not, with any degree of priority. For example, a list of centroids may be passed over from leftmost to rightmost in a two-dimensional space, and top-most to bottom-most for centroids with the same horizontal position, may each then snap to the nearest neighboring intersection that is not already taken by another snapped point.

As another example, centroids may be listed according to the distance to both or each of their nearest intersection and sorted according to that distance, so that the centroids with the shortest snapping distances are snapped first. As yet another example, intersections may be ranked by the distance of their nearest centroids, and each receive a snapped point by the nearest centroid in order of the shortest distances until each intersection has a centroid snapped to it.

At step 230, the method includes removing exterior points. An example removal of exterior points is shown by comparing FIG. 3D, where exterior points are present, and FIG. 3E, where exterior points have been removed. An exterior point may be a centroid that is exterior relative to the boundary. For example, if the area above boundary 302 is considered exterior, all points above the boundary may be identified as exterior points. Accordingly, such exterior points are illustrated as removed in FIGS. 3E-3F. Exterior or interior regions may be identified or defined by a user, or by a computational process, as with the process for identifying a boundary described at 220. For example, if a boundary is a pipe, the exterior may be the exterior of the pipe, the exterior of the inner edge of the pipe, or all points above the pipe (where points below the pipe are considered relevant to the system due to a potential leak issue).

Removing a centroid may include deleting a centroid, marking it as removed or excluded, creating a new set of points without the removed centroid, or any other action that may render a set of centroids that is distinct from the preexisting set in that it does not contain the removed centroid.

At step 235, the method includes removing centroids that neighbor snapped points. An example removal of neighbors is shown by comparing FIG. 3E, where centroids that neighbor snapped points are shown, and FIG. 3F, where centroids that neighbor snapped points have been removed. Centroids may be deleted, moved to the snapped points, or replaced by snapped points, or otherwise displaced from the previous position (the original centroid) and placed in the new position (the snapped point at the intersection). In preferred embodiments, all centroids in border cells may be removed.

At step 240, the method includes identifying a Voronoi partition from a set of remaining centroids and snapped points. An example Voronoi partition is shown in FIG. 3G. It should be understood that the Voronoi partition is represented by the solid lines in FIG. 3G. A Voronoi partition may alternatively referred to as a Voronoi tessellation, and may be used to tile the space by a set of cells built around a set of points (or centroids), such as by edges (in the case of a two-dimensional space) or other bisecting loci equidistant from those points. A Voronoi partition may partition a space of any dimensions, and may be defined in terms of pure data or in terms of a visualization, which may be referred to as a Voronoi diagram.

At step 245, the method includes clipping edges of the Voronoi partition by the boundary. Clipping an edge may include removing an exterior portion of an edge or of a cell from the partition, or creating a new edge to redefine the cell without the exterior portion. Clipping an edge may be performed to avoid or resolve a sliver cell or a sliver boundary face.

At step 250, the method includes creating boundary patches for the Voronoi partition. A boundary patch may be a new cell or extension of an existing cell to cover the area between existing cells and a boundary. For example, FIG. 3G includes border cell 316, which has been expanded, filled, closed, or split by a boundary patch, to better approximate the geometry of the boundary.

Sliver cells and sliver boundary faces may be cell fragments created when the boundary intersects a cell that corresponds to an interior (non-snapped) centroid or point. Identifying snapped points at 225 and removing neighboring centroids at 235 may protect against sliver cells or sliver boundary faces by reducing cases where a boundary intersects a cell other than the cells around snapped points. Clipping a cell by an interior boundary may result in sub-cells of similar size on both sides of the boundary, and the created clipping faces may be used as conformal interfaces between volume regions.

A boundary patch may be created with respect to any number of boundaries in a space. For example, if two boundaries form a corner, an edge may be created corresponding to the corner.

Furthermore, the Voronoi partition or Voronoi diagram may be clipped, by the boundary or by the limits of the space, closing off open cells so that the Voronoi partition only covers a finite area. In preferred embodiments, the Voronoi partition or Voronoi diagram may be clipped before it is used or provided to a user in any way, including use to prepare a visualization or mesh and output to other programs that may use the Voronoi partition or Voronoi diagram.

Accordingly, the term "Voronoi partition" and "Voronoi diagram" used herein, and particularly used below, may refer to a clipped Voronoi partition or clipped Voronoi diagram.

The method optionally includes generating a mesh for a physical object or system using the Voronoi partition or Voronoi diagram. The Voronoi partition or diagram itself may be used as a mesh, or a mesh may be generated based on the Voronoi partition. Outputting a Voronoi partition may be performed by outputting a mesh based on a Voronoi partition.

The method optionally includes outputting the Voronoi partition. A partition may be output as data formatted in any way, or as a visualization representing the partition, such as a Voronoi diagram. Outputting a partition may be performed by providing the output to a user, or to another program, such as by way of an Application Programming Interface (API).

A partition may be output in any format, including a data-based format or as a visualization. A visualization may be formatted for interpretation by a specialized program or in a more generic format, including a pure visual format such as an image or video format. The output may include a history, such as a history of the steps used to generate the Voronoi partition. Examples of visualizations are included at FIGS. 3A-I, 4A-B, and 5. Data formats may include structured data formats, specialized formats for representing Voronoi partitions, generic formats such as XML which may describe any type of data, or other formats such as a spreadsheet format for review in a spreadsheet program.

The output may be output to a user or to another program. Outputting to a user may include displaying data or a visualization to a user, communicating the output to a user (such as by a notification, message, or e-mail), output to a location for which the user is granted access (such as a user device, a user-accessible server, or a cloud storage location), or otherwise made available to the user. Outputting to another program may be performed, for example, by putting the output in a location available to the program as file input, by providing the output to an API associated with the program, or using a program as an intermediary to deliver the output to any other endpoint.

In further embodiments, the output may be printed or otherwise rendered into a physical form, including printing of a visualization in two or three dimensions or printing of data.

The output may then be used, by a user or by another program, in order to model, simulate, study, or otherwise address the space or a system therein. For example, a 3D-modeling program may use a Voronoi partition to represent or highlight areas of interest in a model of a pipe, such as points in the pipe that show a significant pressure drop or are likely to leak; as another example, a user may choose to overlay a Voronoi diagram onto an existing model of a heat transfer system in order to better understand the heat transfer system and achieve a more efficient design for the space in which heat is being transferred. The user may choose to create the Voronoi diagram, or the Voronoi diagram may be generated automatically in the background and added as an overlay in response to user input.

The method may identify any number of spaces, systems, and Voronoi partitions, and may draw associations between associated systems. For example, in a large 3-dimensional space representing a vehicle, smaller 3-dimensional subsections and 2-dimensional cross sections of the space may be used to represent fans, windows, or other points of interest in the large space. Such an example is further depicted at FIGS. 4A and 4B.

FIGS. 3A-G are exemplary states of spatial distribution in the process preparing a Voronoi partition of a space or system. FIG. 3H is example of an alternative Voronoi diagram not produced by the method of FIG. 2, and FIG. 3I is a close-up view of FIG. 3H.

FIG. 3A depicts a two-dimensional space; a regular tiling of the two-dimensional space by a spatial subdivision tree that subdivides the space into squares, with greater resolution in the left half of the space and lower resolution in the right half of the space; centroids of each cell in the spatial subdivision tree; and a curved boundary 302 that reaches across the space.

Then, at FIG. 3B, dual edges are drawn between the centroids of each pair of cells that share an edge, such as dual edge 308 between centroids 304 and 306.

Next, at FIG. 3C, intersection points 312 and 314 are drawn where the dual edges drawn at 3B intersect with the boundary. Intersection points 312 and 314 may correspond to centroid 310.

Then, at FIG. 3D, neighboring centroids are mapped to the snapped points. For example, centroid 310 may be snapped to intersection point 312, which can now be thought of as snapped point 312.

Figure 3E:
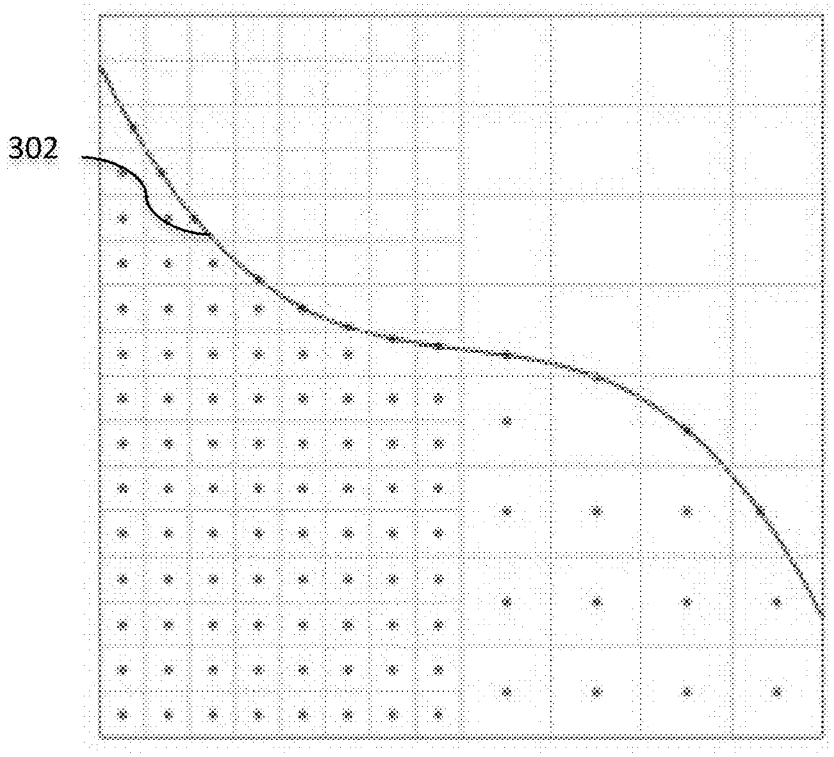

Next, at FIG. 3E, the neighboring centroids are moved to the mapped snapped points.

Figure 3F:
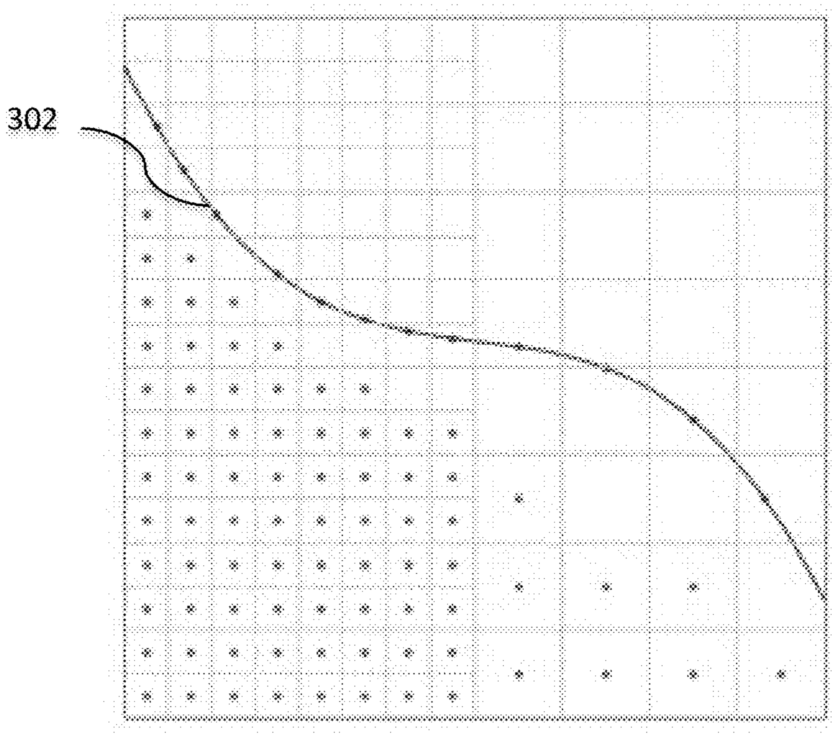
Figure 3G:
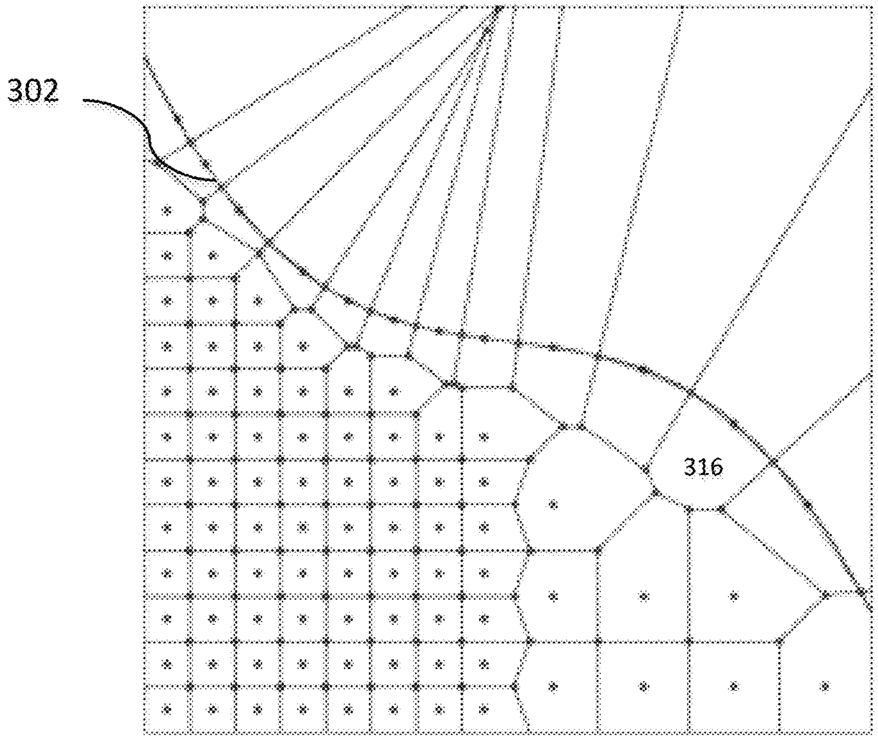
Figure 3H:
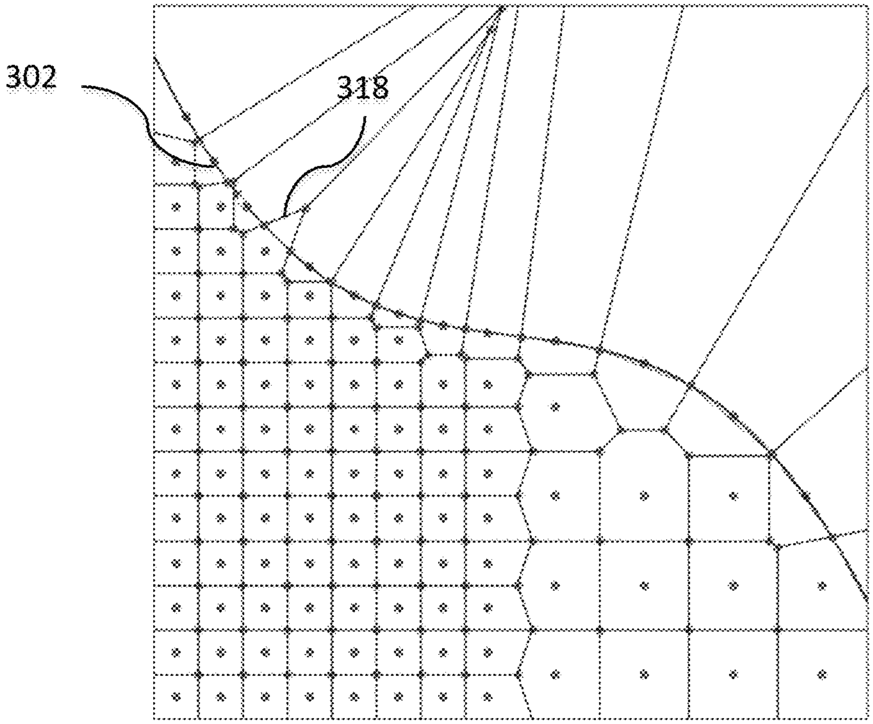
FIG. 3H is an example of an alternative Voronoi diagram not produced by the method of FIG. 2, and FIG. 3I provides a closer view of the diagram in FIG. 3G.
Figure 3I:
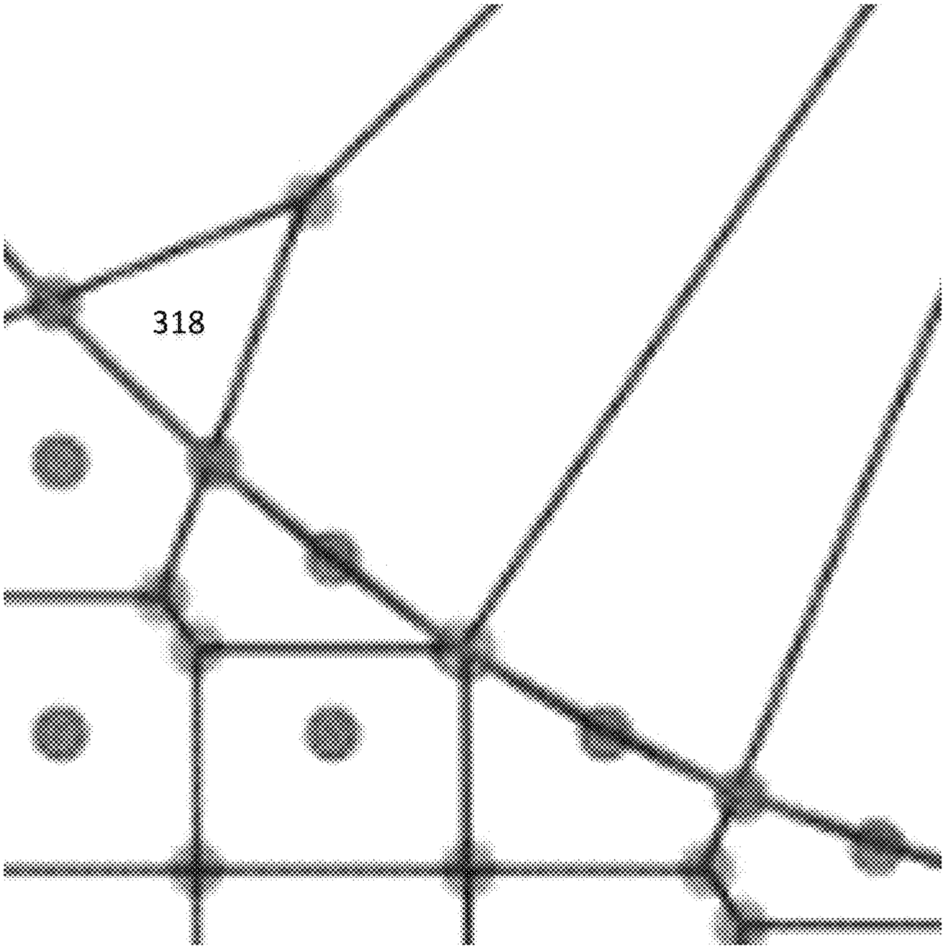

Then, at FIG. 3F, any remaining centroids that neighbor the boundary that are not yet moved to snapped points are removed from the tiling.

Next, at FIG. 3G, a Voronoi diagram is drawn from the remaining centroids and snapped points. Voronoi edges are clipped by the boundary, and boundary patches are created.

FIG. 3H depicts a Voronoi diagram or similar mesh that is made not according to the process described at FIG. 2. Particularly, FIG. 3H depicts a Voronoi diagram also built around Boundary 302, but may not engage in such steps as removing neighboring centroids, clipping edges, or creating boundary patches. Accordingly, the diagram in FIG. 3H exhibits issues such as sliver cells and sliver boundary faces, including, for example, sliver cell 318. FIG. 3I provides a close-up view of sliver cell 318 in the context of the mesh of FIG. 3H.

Figure 4A:
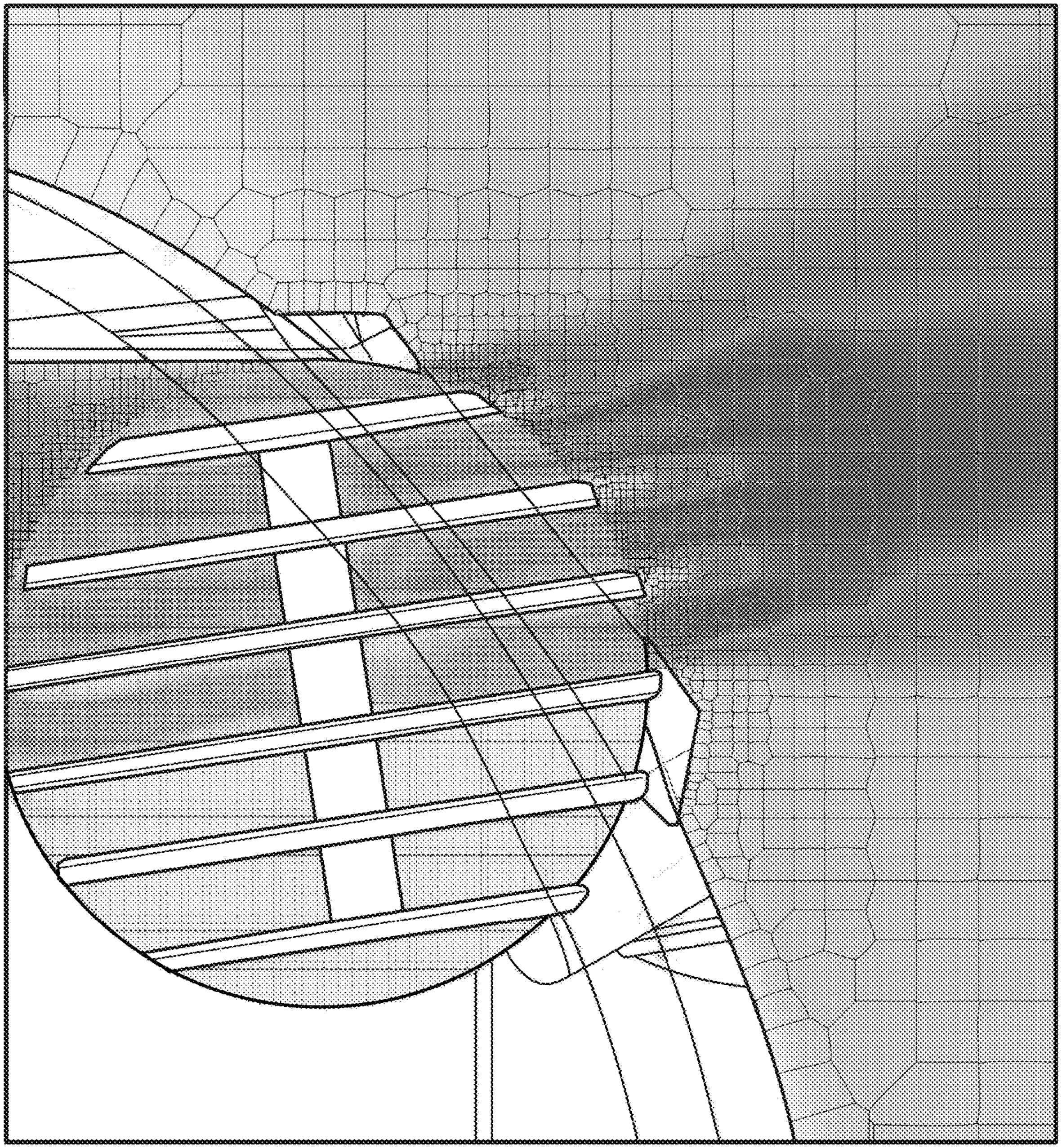
FIG. 4A depicts an exemplary Voronoi diagram detailing a system for heat transfer within a vehicle.

FIG. 4A depicts an exemplary visualization including a Voronoi diagram detailing a system for heat transfer within a vehicle. The system for heat transfer may include a fan, air conditioning system, heating system, or nozzle for one or more of these systems. The diagram may further depict the space surrounding the system, or different heat or air patterns surrounding the system.

The Voronoi diagram may involve different cell densities, as determined by densities of a spatial subdivision tree, which may correspond to points of interest, such as those described at 210.

The system may be updated over time as heat patterns change, as heat settings for the heat transfer system change, or as the nozzle moves. Changes in the system may trigger a change in the Voronoi partition according to the method described at FIG. 2, or may continue to be described by the existing Voronoi partition.

Figure 4B:
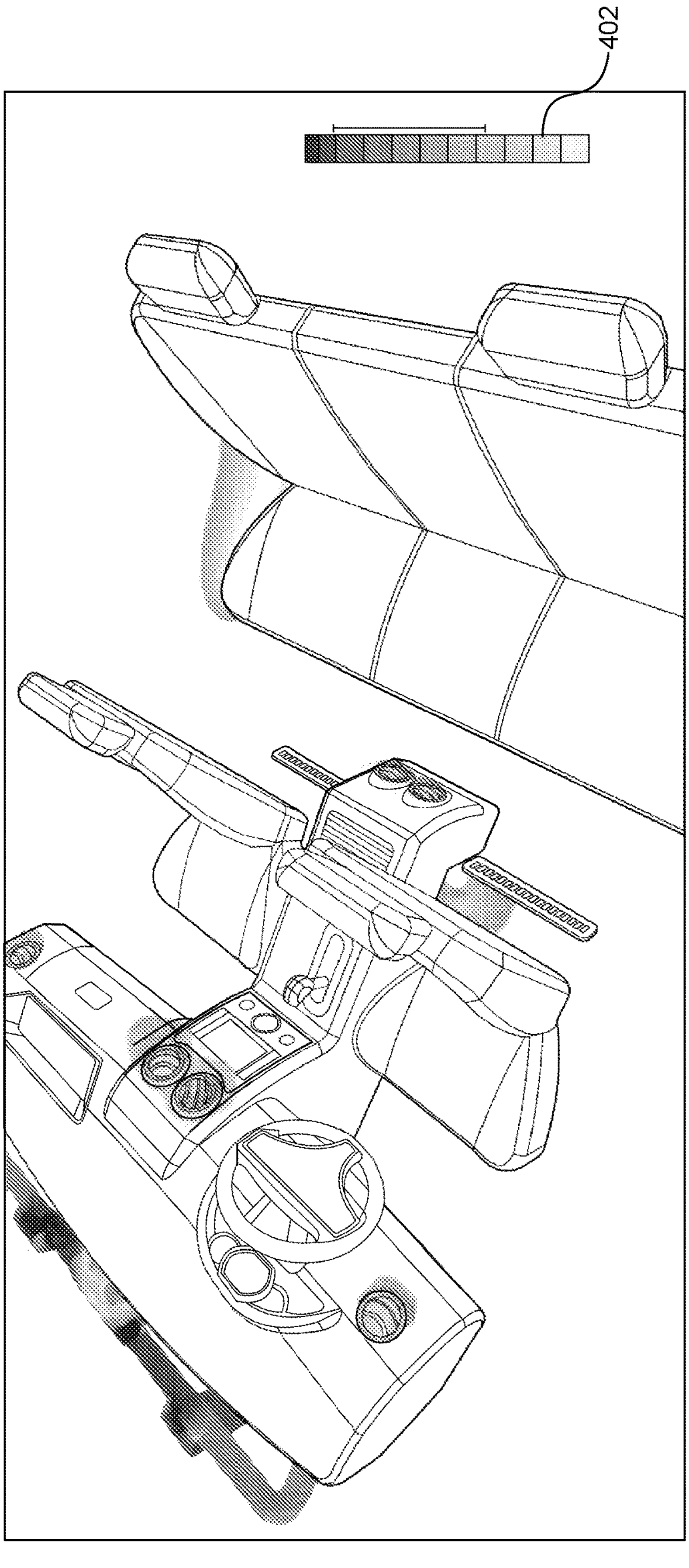
FIG. 4B depicts a greater space representing the vehicle as a whole.

Then, at FIG. 4B, a greater space is depicted, representing a larger section of the vehicle described at FIG. 4A. The vehicle may contain the heat transfer system of FIG. 4A, and, in various exemplary embodiments, any combination of other details pertaining to a vehicle, such as windows, a windshield, a dashboard, compartments, seats, a steering wheel, computing devices, vents, passengers, and other heat transfer systems. The greater space may only include the interior of the vehicle, or may include other parts of the vehicle, including a trunk or engine, or external parts of the vehicle, especially as may relate to the thermodynamics of the system. The visualization may further include overlays or features such as a heat map or heat scale 402.

Figure 5:
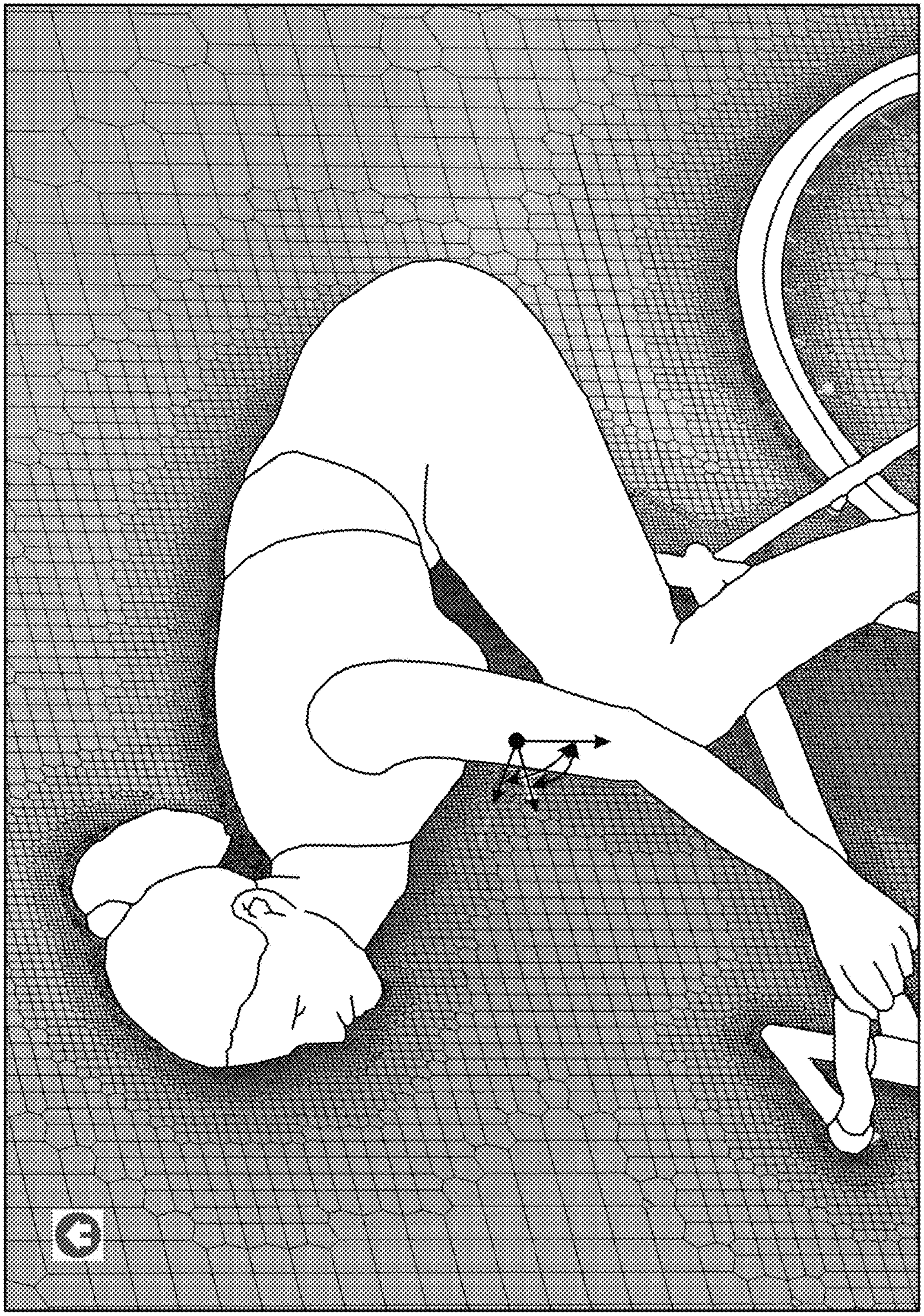
FIG. 5 depicts an exemplary Voronoi diagram covering a space containing a person riding a bicycle.

FIG. 5 depicts an exemplary visualization that includes a Voronoi diagram covering a space containing a person riding a bicycle. The visualization may be still or interactive, and may include other overlays, particularly including an axis overlay describing several directions within the system, vector or angular overlays describing physical effects or dispositions within the system, or user interface features allowing a user to modify the visualization, such as by switching between views; adding color overlays for photo-realism, a heat map, or any other visual feature; or by hiding or showing a more extensive user menu, for example.

Examples herein are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A processor-implemented method, the method comprising:

creating a spatial subdivision tree comprising a plurality of cells;

identifying one or more dual edges, where each dual edge connects centroids of two adjacent cells from the plurality of cells;

identifying a set of intersections of dual edges from the one or more dual edges with a boundary;

identifying a set of snapped points, wherein a snapped point in the set of snapped points represents a closest intersection from the set of intersections to a closest centroid of a border cell, and wherein the border cell is a cell from the plurality of cells that intersects the boundary;

removing a plurality of exterior points, wherein an exterior point is a centroid that is exterior relative to the boundary;

removing centroids that neighbor snapped points;

identifying a Voronoi partition from a set of remaining centroids and snapped points;

clipping the Voronoi partition by the boundary; and creating boundary patches for the Voronoi partition.

2. The method of claim 1, further comprising outputting the Voronoi partition.

3. The method of claim 1, further comprising:

providing a user with a visualization of a Voronoi diagram for the Voronoi partition.

4. The method of claim 3, wherein the boundary represents a physical border in the space, and wherein a centroid being exterior relative to the boundary is positioned on a side of the physical border that is external to the physical object or system.

5. The method of claim 1, wherein the spatial subdivision tree subdivides a space containing a physical object or system.

6. The method of claim 5, wherein the Voronoi partition is used to simulate the physical object or system.

7. The method of claim 1, wherein creating a spatial subdivision tree further includes determining two or more resolutions for different portions of the spatial subdivision tree.

8. The method of claim 1, wherein the spatial subdivision tree is an octree subdividing a three-dimensional space.

9. A computer system, the computer system comprising:

one or more processors, one or more computer-readable memories, one or more computer-readable tangible storage media, and program instructions stored on at least one of the one or more memories, wherein the computer system is capable of performing a method comprising:

creating a spatial subdivision tree comprising a plurality of cells;

identifying one or more dual edges, where each dual edge connects centroids of two adjacent cells from the plurality of cells;

identifying a set of intersections of dual edges from the one or more dual edges with a boundary;

identifying a set of snapped points, wherein a snapped point in the set of snapped points represents a closest intersection from the set of intersections to a closest centroid of a border cell, and wherein the border cell is a cell from the plurality of cells that intersects the boundary;

removing a plurality of exterior points, wherein an exterior point is a centroid that is exterior relative to the boundary;

removing centroids that neighbor snapped points;

identifying a Voronoi partition from a set of remaining centroids and snapped points;

clipping the Voronoi partition by the boundary; and creating boundary patches for the Voronoi partition.

10. The computer system of claim 9, the method further comprising outputting the Voronoi partition.

11. The computer system of claim 9, the method further comprising:

providing a user with a visualization of a Voronoi diagram for the Voronoi partition.

12. The computer system of claim 9, wherein the spatial subdivision tree subdivides a space containing a physical object or system.

13. The computer system of claim 12, wherein the Voronoi partition is used to simulate the physical object or system.

14. The computer system of claim 9, wherein the boundary represents a physical border in the space, and wherein a centroid being exterior relative to the boundary is positioned on a side of the physical border that is external to the physical object or system.

15. A computer program product, the computer program product comprising:

one or more non-transitory computer readable tangible storage media and program instructions stored on at least one of the one or more tangible storage media, the program instructions executable by a processor capable of performing a method, the method comprising:

creating a spatial subdivision tree comprising a plurality of cells;

identifying one or more dual edges, where each dual edge connects centroids of two adjacent cells from the plurality of cells;

identifying a set of intersections of dual edges from the one or more dual edges with a boundary;

identifying a set of snapped points, wherein a snapped point in the set of snapped points represents a closest intersection from the set of intersections to a closest centroid of a border cell, and wherein the border cell is a cell from the plurality of cells that intersects the boundary;

removing a plurality of exterior points, wherein an exterior point is a centroid that is exterior relative to the boundary;

removing centroids that neighbor snapped points;

identifying a Voronoi partition from a set of remaining centroids and snapped points;

clipping the Voronoi partition by the boundary; and creating boundary patches for the Voronoi partition.

16. The computer program product of claim 15, the method further comprising outputting the Voronoi partition.

17. The computer program product of claim 15, the method further comprising:

providing a user with a visualization of a Voronoi diagram for the Voronoi partition.

18. The computer program product of claim 15, wherein the spatial subdivision tree subdivides a space containing a physical object or system.

19. The computer program product of claim 18, wherein the Voronoi partition is used to simulate the physical object or system.

20. The computer program product of claim 15, wherein the boundary represents a physical border in the space, and wherein a centroid being exterior relative to the boundary is positioned on a side of the physical border that is external to the physical object or system.

* * * * *